(12) United States Patent
Frankel

(10) Patent No.: US 6,462,827 B1
(45) Date of Patent: Oct. 8, 2002

(54) PHASE-BASED WAVELENGTH MEASUREMENT APPARATUS

(75) Inventor: Robert Frankel, Rochester, NY (US)

(73) Assignee: Chromaplex, Inc., West Henrietta, NY (US)

(*) Notice: Subject to any disclaimer, the term of this patent is extended or adjusted under 35 U.S.C. 154(b) by 0 days.

(21) Appl. No.: 10/135,748

(22) Filed: Apr. 30, 2002

Related U.S. Application Data

(60) Provisional application No. 60/287,319, filed on Apr. 30, 2001.

(51) Int. Cl.[7] ................................................. G01B 9/02
(52) U.S. Cl. ........................................ 356/491; 356/453
(58) Field of Search ................................ 356/491, 453, 356/484, 451

(56) References Cited

U.S. PATENT DOCUMENTS 6,373,871 B1 * 4/2002 Hemmes et al. ............... 372/28

* cited by examiner

Primary Examiner—Frank G. Font
Assistant Examiner—Phil Natividad
(74) Attorney, Agent, or Firm—Ropes & Gray

(57) ABSTRACT

A laser wavelength meter determines the unknown wavelength of a laser by measuring the phase difference between two orthogonally polarized beams derived from the laser. The orthlogonally polarized beams propagaic along two optical paths of different length as defined, for example, by a polarizing beam splitter or a stepped reflector with a defined step height. An in situ reference laser of known wavelength allows calculation and monitoring of the path difference between the two optical paths.

13 Claims, 3 Drawing Sheets

PHASE-BASED WAVELENGTH MEASUREMENT APPARATUS

CROSS-REFERENCE TO OTHER PATENT APPLICATIONS

This application is claims the benefit of U.S. provisional patent application Ser. No. 60/287,319, filed Apr. 30, 2001, the subject matter of which is incorporated herein in its entirety.

FIELD OF THE INVENTION

The invention is directed to systems and methods for measuring and controlling wavelength, and more particularly to such systems and methods that accurately measure and control the output wavelength of CW and pulsed lasers.

BACKGROUND OF THE INVENTION

Measuring and controlling a laser wavelength accurately over a large continuous wavelength range at low continuous or pulsed input power and/or at high pulse repetition rate is a difficult and important problem in many areas of technology, including excimer laser microlithography and wavelength division multiplexed (WDM) fiber optic communication systems. Previously disclosed approaches for measuring laser wavelengths suffer from one or more limitations, including poor sensitivity, difficult calibration, long measurement times, or the physical size of the equipment.

At present there exist at least four methods for measuring laser wavelength: grating spectrometers, etalon-based wavelength meters, and scanning Michelson interferometers, as well as a recently introduced phase sensitive wavelength meter. While all four methods can be used to measure continuous lasers, only grating spectrometers and etalon-based wavelength meters have been found acceptable for pulsed laser applications.

The resolution of a grating spectrometer is equal to the product of the diffraction order number m and the number of grooves N:

$$\lambda/\Delta\lambda = mN \quad (1)$$

Equation (1) implies that the resolving power of the grating is equal to the number of wavelengths in the path difference between rays that are diffracted in the direction of the center wavelength of the laser line from the extreme ends of the gratings. In laser wavelength metrology it is often required to only locate the center of the laser spectrum with extreme accuracy, not to resolve closely spaced individual spectral lines. Still, in order to achieve the required linewidth line center localization of 0.1 pm, or better, very large grating spectrometers are required. In addition, the key to accurate wavelength measurement is the incorporation of very accurate and stable calibration sources into the spectrometer. Stable laser sources of known wavelength, such as frequency doubled Argon Ion laser light at 244 nm, or stabilized Helium-Neon lasers at 632.99 nm may be used. Another technique uses known absorption lines that are backlit by a broad band light source and the resulting absorption spectrum may impinge on the recording plane of the spectrometer onto a charge coupled device (CCD) or photodiode array detector.

Etalon-based wavelength meters are significantly smaller than high-resolution grating based spectrometers, and normally have higher resolution as well. A fixed Fabry-Perot etalon is composed of parallel, high reflectivity, mirrors separated by a defined spacing. Other types of etalons such as Fizeau or scanning Fabry-Perot etalons maybe used, however, since many of their performance characteristics are the same as fixed Fabry-Perot etalons they will not be reviewed here. We review the performance characteristics of the Fabry-Perot etalon based wavelength meter as an example of this category of wavelength meters. If the Fabry-Perot etalon is illuminated by collimated light, only a very narrow wavelength will be in resonance with the cavity and be transmitted. This geometry is not generally used in wavelength meter applications. If a diverging beam illuminates the etalon, transmission occurs only at angles of incidence such that the path length between mirrors is an integral number of incident wavelengths. This geometry is routinely used in laser wavelength meters.

An Etalon is characterized by a figure of merit called its finesse F which equals:

$$\mathcal{F} = \pi\sqrt{\frac{R}{1-R}} \quad (2)$$

Where R is the reflectivity of each mirror, assuming both cavity mirrors have the same reflectivity. For Fabry-Perot etalons illuminated with a diverging beam the resolving power $\Delta\lambda/\lambda$ equals:

$$\frac{\lambda}{\Delta\lambda} = 0.97 * m * \mathcal{F} \quad (3)$$

where m is the order number representing an integer number of wavelengths that separate the mirrors. At near normal incidence $m \approx 2n\lambda/\lambda$, where n is the refractive index of the medium between the mirrors at the wavelength X, and h is the physical separation of the mirrors. In order to use an etalon properly one must know the spacing between the mirrors to within an order number, or else there is ambiguity in determination of wavelength. The wavelength range between consecutive orders is called "Free Spectral Range" (FSR) of the etalon, where:

$$FSR = \lambda/m = \lambda^2/2n\lambda \quad (4)$$

Thus as can be seen from equation (4) the FSR decreases as the separation between the mirrors h increases. The resolution of the etalon also increases as the FSR increases. It is known that etalons themselves and the optics associated with an etalon-based wavelength meter are not absolutely stable. Therefore, the etalon spacing and angles of incidence of the laser beam must be continuously calibrated either with a stable reference laser, such as a HeNe laser, or with a backlit absorption cell having well-calibrated absorption lines. The calibration light should be well reflected by the etalon mirrors, and with adequate, such that the resolution of the reference lines is equivalent to that of the unknown laser lines. The spectra of the reference laser and of the excimer laser are both recorded by an array detector, usually a charge-coupled device (CCD), or a photodiode array. Ideally, a single array is used that is sensitive to both the reference and laser wavelengths to be measured.

A single etalon may be used to improve the measurement accuracy of the laser wavelength to 1 part in 50–100 of the Etalon's FSR. It the laser wavelength is not known to the accuracy of about ½ the FSR, and then one or more additional etalons of reduced resolution can be used to more accurately estimate the wavelength before finally determining the laser wavelength with the etalon having the longest spacing.

Both spectrometer and etalon based wavelength measurement techniques suffer from serious drawbacks in wavelength measurement. Both techniques can use array detectors to measure an excimer laser spectrum. Array detectors can be read out at the 1–4 kHz sample rates required, but are inherently noisy during high speed scanning operation. This results in reduced signal detectivity and thus poor accuracy at higher data rates. Slower data rates result in a better signal-to-noise ratio, but may not properly record all the laser pulses. Spectrometers of adequate resolution for high-resolution laser wavelength measurement are large instruments, have very large gratings, are difficult to absolutely calibrate. Etalon spectrometers are inefficient. In transmission, light at only the correct angle produces interference orders. Therefore only about 1–5% of the incident light is used in measuring wavelength. If more than one etalon is required, due to inadequate initial knowledge of the laser wavelength, the efficiency drops rapidly as the incident power must be divided into several beams.

High-resolution scanning Michelson wavelength meters are often used to measure the wavelength of continuous or very high (greater than megahertz) repetition rate lasers. They cannot be used to measure pulsed lasers of low repetition rate (kHz). In a scanning Michelson interferometer the laser to be measured is split into 2 paths by a beamsplitter. At the end of each path, called an arm of the interferometer, is a reflecting mirror that directs the beams back to the beamsplitter. The 2 beams are recombined and the signal is recorded on a photodiode. The path length of one arm of the interferometer is continuously varied and a time sequence of the intensity of the two interfering beams is recorded by the digitized output of the photodiode. If the path length of the light in each arm differs by an integral number of wavelengths of the reference beam than the two beams will combine constructively. If the path length differs by ½ of a wavelength, the beams will interfere destructively. The laser wavelength is determined by either counting the number of interference peaks (called fringes), and measuring the final partial fringe in the scanning interferometer or by taking the Fourier transform of the entire interferometer scan. The actual measure of displacement is usually made by counting the fringes in a parallel or collinear laser of know wavelength such as a Helium Neon laser. Commercial systems are marketed that measure wavelength to 0.1 pm. However, these systems do not work with pulsed lasers, measurement time is long –0.1–1.0 second per measurement and are limited in sensitivity to about 0.1 $\mu$W of input power. U.S. Pat. No. 6,043,883 discloses another type of wavelength meter which uses a circularly polarized beam impinging on a birefringent crystal, referred to as retardation plate, with orthogonal polarizations aligned with the ordinary and extraordinary axes of the crystal. Each polarization direction propagates at a different velocity in the crystal based-upon the refractive index difference between the two axes. Thus as the beam propagates its polarization state can be described as elliptical. An analyzer at the output of the crystal separates out the polarization state of the elliptical light. The wavelength can be determined from the ratio of the intensities at the two polarizations and the thickness of the crystal. However, the refractive index of most birefringent crystals tends to have strong temperature dependence and the axes of the crystal need to be precisely aligned relative to the laser beam. Accordingly, the temperature of the crystal must be taken into account so that the temperature variations in the refractive index and physical dimensions of the crystal can be compensated for in the wavelength determination.

It would be desirable to provide a more accurate and less complex system and method for wavelength measurements as well as a wavelength meter that is more compact than conventional systems.

SUMMARY OF INVENTION

The invention is directed to a laser wavelength meter that measures a phase difference between two orthogonally circularly polarized laser beams derived from a single laser beam. The polarized beams propagate along two different optical paths of a polarizing beamsplitter that differ by a known path length difference, and are then recombined. The orthogonal polarizations of a circularly polarized reference laser of known wavelength, such as a He-Ne laser, are separated and combined along the same path as the laser of unknown wavelength. Knowledge of the reference laser wavelength and the phase difference built up by the reference laser allows calculation of the path length difference. The so determined path length difference is then used to calculate the unknown wavelength of the laser under test from a measurement of the phase difference built up by the laser under test. The longer the optical path length, the greater the accuracy with which the wavelength of the unknown laser can be determined.

According to one aspect of the invention, a wavemeter for measuring an unknown wavelength of an optical beam includes a reference beam of a known wavelength having two orthogonally circularly polarization directions, a polarizing beam splitter receiving the orthogonally polarized reference beam and defining an interferometer with a difference in an optical path length between the two orthogonally circularly polarized directions, and a first analyzer receiving from the polarizing beam splitter a combined reference beam with the path length difference, the first analyzer determining the path length difference from an intensity measurement of the two orthogonally circularly polarization directions of the combined reference beam. The wavemeter further includes a polarizer converting the optical beam of the unknown wavelength into two orthogonally circularly polarized beams, with the two orthogonally circularly polarized beams of the unknown wavelength traversing in the polarizing beam splitter an optical path that is substantially identical to an optical path of the reference beam in the polarizing beam splitter, and a second analyzer that receives from the polarizing beam splitter a combined beam of the unknown wavelength with the path length difference, the second analyzer determining the unknown wavelength from an intensity measurement of the two orthogonally circularly polarization directions of the combined beam of the unknown wavelength and the path length difference determined by the reference beam.

Embodiments of the invention may include one or more of the following features. The first and second analyzer can include photodiodes that measure the intensity of the different polarized beams. At least one chopper may be provided that alternatingly interrupts the reference beam and the optical beam of unknown wavelength. In this case, the first and second analyzer can be the same analyzer. The path length difference of the interferometer can be determined by a length of the polarizing beam splitter. The polarizing beam splitter can also be implemented as a Wollaston prism, in which case the path length difference of the interferometer is determined by a step height difference of a stepped reflector.

The wavemeter may include more than one polarization beam splitter having different free spectral ranges (FSR), wherein each of the polarization beam splitters receive a portion of the reference beam and the beam of the unknown wavelength and has associated therewith at least one analyzer receiving from the corresponding polarizing beam splitter a combined reference beam and a combined beam of the unknown wavelength with a path length difference characteristic of the polarizing beam splitter, each of the analyzers determining the unknown wavelength with an accuracy depending on the FSR of the corresponding polarization beam splitter.

According to another aspect of the invention, a method is described for determining an unknown wavelength of an optical beam. The method includes propagating in an polarizing beam splitter two orthogonally circularly polarized beams produced from a reference beam, the two orthogonally circularly polarized beams traversing different optical paths having different path lengths; determining a difference in the optical path lengths for the reference beam;. generating from the optical beam of unknown wavelength two orthogonally circularly polarized beams; propagating in the polarizing beam splitter the two orthogonally circularly polarized beams produced from the optical beam along the different optical paths traversed by the reference beam; determining a phase shift between the propagated two orthogonally circularly polarized beams produced from the optical beam; and determining the unknown wavelength of the optical beam from the determined phase shift and the difference in the optical path lengths.

According to one embodiment, a difference in said optical path lengths for said reference beam can be monitored during the duration of a measurement, and said optical path lengths updated. This enhances the thermal and environmental stability of the wavemeter.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE INVENTION

The invention is directed to a wavelength measurement system for lasers that compares the wavelength of an unknown laser with the known wavelength of a reference laser that is part of the measurement system. More particularly, the employed measurement technique relies on the measurement of phase differences between orthogonally polarized beams and employs a robust polarizing beamsplitter.

Figure 1:
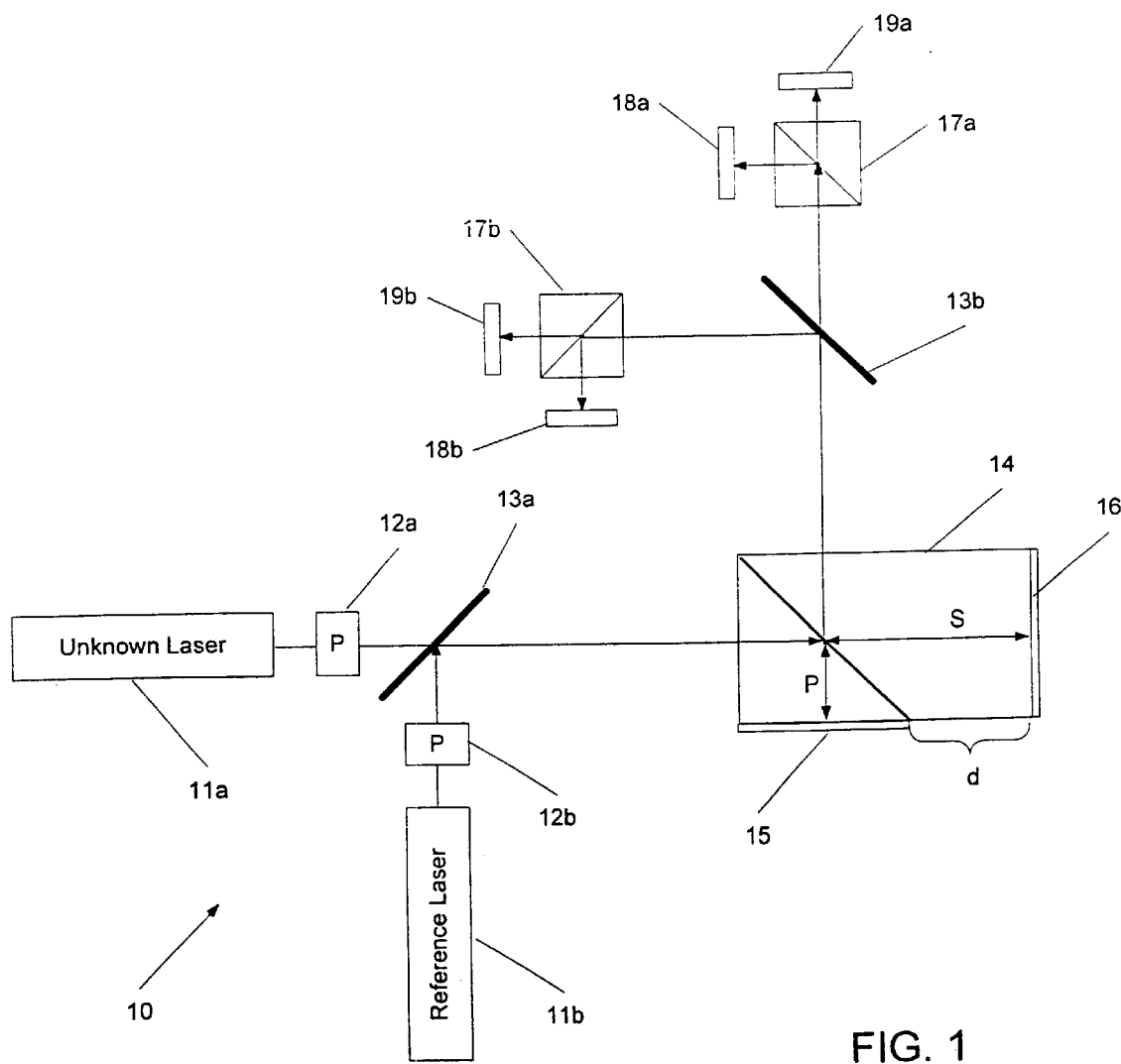
FIG. 1 shows a first embodiment of a phase sensitive laser wavelength meter.

Referring first to FIG. 1, in a laser wavelength measurement system 10 light from a laser 11a of unknown wavelength is circularly polarized in two orthogonal polarization directions in waveplate 12a, and after passing through a dichroic beamsplitter 13a is directed into a polarizing beamsplitter 14 such that light of each orthogonal polarization, s and p, is made to traverse separate paths upon exiting the polarization splitting interface. The polarizing beamsplitter 14 may be implemented in form of a cube or plate polarizing beamsplitter. The unknown wavelength laser light from each polarization reflects off corresponding high reflectance mirrors 15, 16 and is recombined and directed to a polarization analyzer 17a of standard design using photodiodes 18a, 19a for the two different polarization directions. The polarized ellipticity of the combined beams can be used to measure the laser wavelength as long as the path difference between the two polarized beams is known precisely. The wavelength measurement algorithm is similar to that used by etalon-based wavelength meters.

Likewise, the reference laser of known wavelength, such as a He-Ne laser or a laser stabilized and locked to known atomic or molecular transitions, is circularly polarized in two orthogonal polarization directions in waveplate 12b, and after being reflected on the dichroic beamsplitter 13a is also directed into the polarizing beamsplitter 14. The optical path difference between the two arms can be calculated from the known wavelength of the reference laser 11b. The light from each polarization again reflects off the high reflectance mirrors 15, 16 and is recombined and reflected by a dichroic mirror 13b into a polarization analyzer 17b of standard design, using photodiodes 18b and 19b to measure the light intensity for the two different polarization-directions.

Accurate calibration requires that the polarizing beamsplitter's passband include the reference laser as well as the unknown laser. The difference in the optical path between the two polarization directions for the reference laser 11b can be written as $$2d = (\lambda_r m_r + \Phi_r)/n_r \qquad (5)$$

and the difference in the optical path between the two polarization directions for the unknown laser 11a as $$2d = (\lambda_u m_u + \Phi_u)/n_u \qquad (6),$$

wherein $\lambda_r$ is the wavelength of the reference laser, $m_r$ is the integral number of reference waves along the path difference of the two polarized beams (order number) and $\phi_r$ is the phase expressed in fractional wavelengths. Likewise, $\lambda_u$ is the wavelength of the unknown laser, $m_u$ is the order number and $\phi_r$ is the phase of the unknown laser expressed in fractional wavelengths. $n_u$ and $n_r$ represent the index of refraction of the material of the polarizing beam splitter at the unknown laser wavelength and known laser wavelength, respectively.

As seen from equation (5), the phase $\phi_r$ is indicative of the distance d (FIG. 1) only if the difference 2d in the optical path between the two polarization directions is known to within a wavelength of the reference laser. For this purpose, the system is initially calibrated with at least three different laser lines that are not integer multiples of one another to determine the order $m_r$ at the wavelength $\lambda_r$ of the reference laser. The derived value for the path d can then be substituted in equation (6), and the following equation can be solved to compute the wavelength $\lambda_u$ of the unknown laser:

$$\lambda_r M_r + \phi_r = (n_r/n_u)(\lambda_u m_u + \phi_u) \qquad (7)$$

The correct values for the refractive index ratio for the reference and unknown lasers, $n_r/n_u$, should be used. The phase $\phi_r$ is measured by measuring the ratio of the light intensities $I_s/I_p$ received by photodiodes 18b, 19b of the polarization analyzer for the reference laser beam. Likewise the phase $\phi_u$ is measured by measuring the ratio of the corresponding light intensities received by photodiodes 18a, 19a for the unknown laser beam.

The fractional path length can be determined from the ratio of intensities in the analyzer from the following equation.

$$\phi 2\pi = \sin^{-1}((I_s - I_p)/(I_s + I_p)) \quad (8)$$

If the phase is zero, then the ratio $I_s/I_p$ of the power measured by the two analyzer diodes will be one. This means that the combined beams create a circularly polarized beam, and an integral number of waves are included in the path difference. In FIG. 1 separate analyzers 17a, 17b are used for the reference laser beam and the unknown laser beam. Corrections in the path length calculations would be made if there were any phase changes within the coatings of the high reflectivity mirrors.

Figure 2:
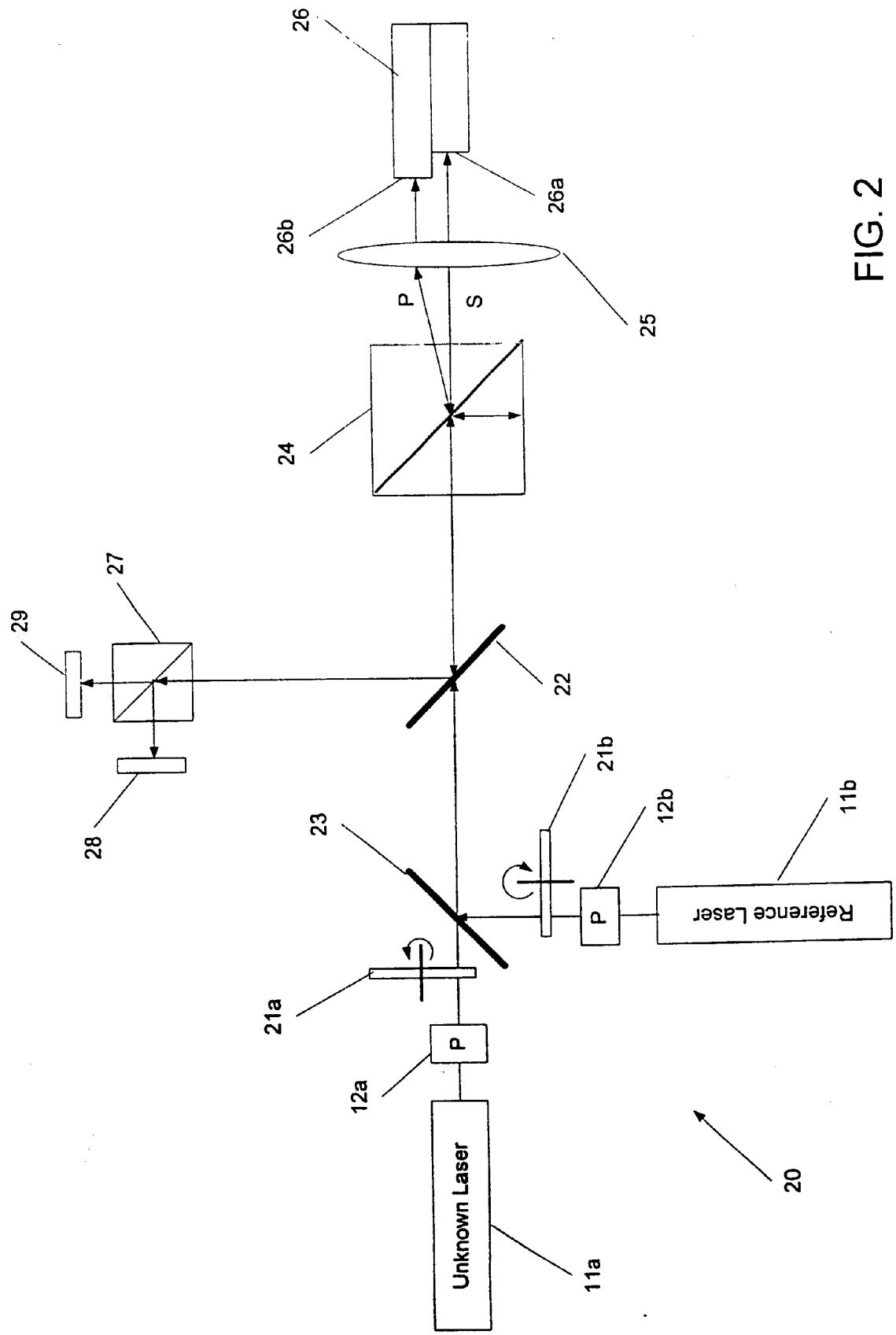
FIG. 2 shows a second embodiment of a phase sensitive laser wavelength meter.

FIG. 2 shows another embodiment of a wavelength measurement system 20 which does not include a polarizing beamsplitter 14, but uses instead a Wollaston prism 24 to separate the two polarization directions. Such system 20 may be suitable for the deep UV wavelength range where polarizing beam splitters that separate beams by 90° are difficult to produce. The output from reference laser 11b and the unknown laser 11a are orthogonally circularly polarized as before and pass through a dichroic mirror to enter the Wollaston prism 24. The s and p polarized beams exit the Wollaston prism 24 in different directions and are collimated by lens 25 and reflected off different steps 26a, 26b of a stepped reflector 26 with a known step height difference between steps 26a and 26b. Surfaces with a well-defined step height can be machined by conventional fabrication processes.

Unlike the measurement system 10 depicted in FIG. 1, the measurement system 20 uses a single analyzer which includes a polarization analyzer 27 of standard design and photodiodes 28, 29. To separate the light from the reference laser 11b and the unknown laser 11a, the system 20 employs choppers 21a, 21b which alternatingly open and close so as to let one or the other of the beams from laser 11b and laser 11a pass through. The light intensities for determining the fractional path length from equation (8) are then measured by the photodiodes 28, 29 in phase with the chopper position by a phase-sensitive detection method known in the art. It will be understood that phase-sensitive detection can also be used with the system 10, while the detection method using two detectors can be used likewise with system 20.

Figure 3:
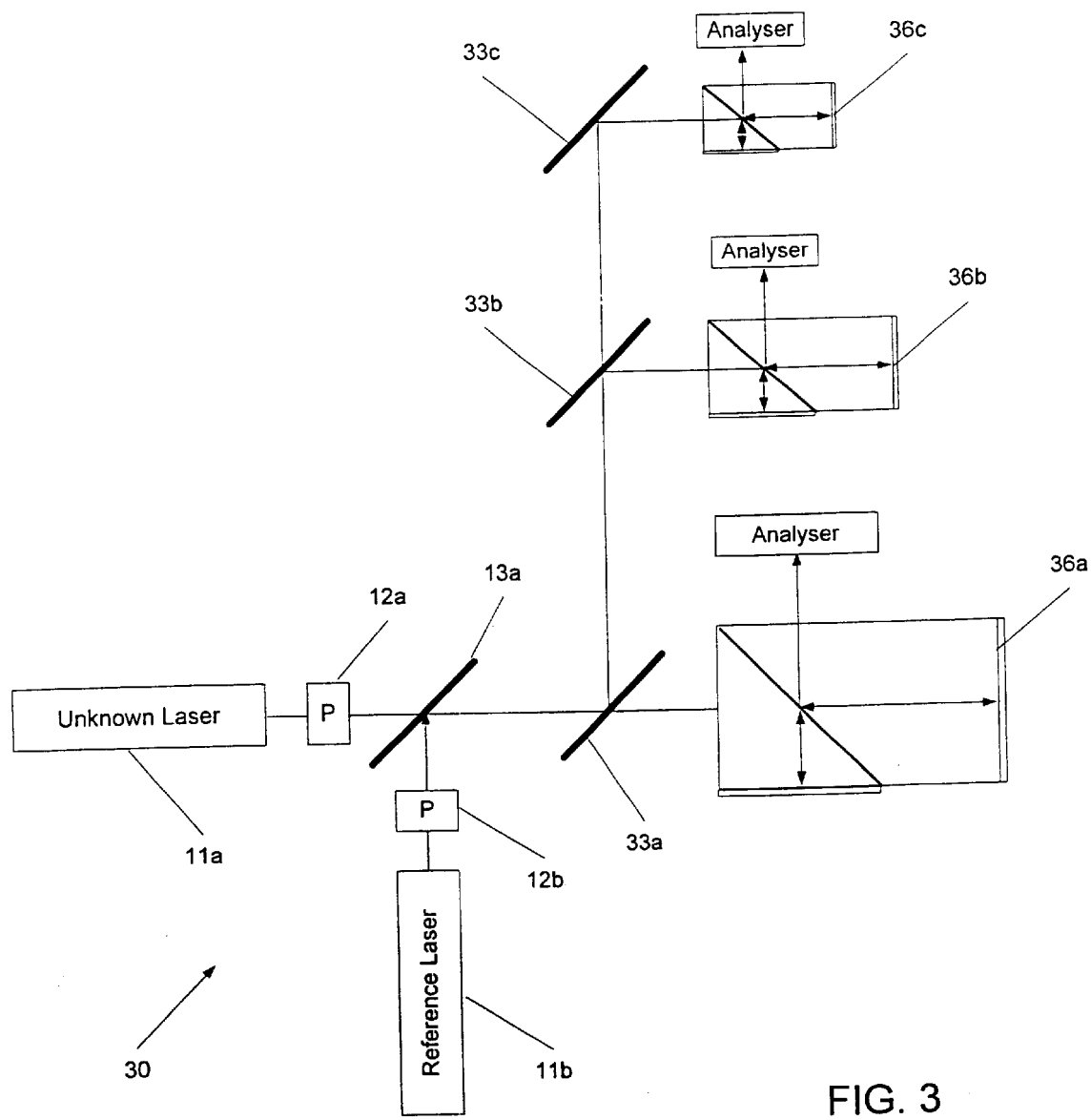
FIG. 3 shows a third embodiment of a phase sensitive laser wavelength meter with increased resolution.

The wavelength of the laser under test can be measured with an accuracy of approximately one half of the free spectral range (FSR) of the device. Accordingly, a high accuracy using this method implies a limited free spectral range. If this is not the case, the laser beam may be split off to provide a refinement of the wavelength estimate laser wavelength using polarization devices with a greater free spectral range, that is, devices with smaller path length differences. In general, the accuracy of measurement can be improved about 20–100 times with each polarization measurement system having an increased path length increment. A multiple system 30 using such "nested" FSP analyzers 36a, 36b, 36c is shown in FIG. 3. Each analyzer 36a, 36b, 36c can either include the dual analyzers 17a, 17b with associated photodiodes of FIG. 1 or the single analyzer 27 and choppers 21a, 21b of FIG. 2.

There are several key requirements to operate at very high accuracy using the system 20 of FIG. 2 for wavelength measurements. First, it assumed that the accuracy of phase determination is about 1°, although it may be significantly higher than this. Resolution is proportional to order number, therefore the higher the order numbers m, the more accurate and precise is the wavelength determination. If m equals 10,000, at a wavelength of 1 μm, a 3° phase change is measured by the analyzer for each 1 pm change in wavelength. This is a measurement accuracy of about one part in $10^6$. If m equals 100,000 an accuracy one part in $10^7$ may be achieved. This level of accuracy requires that the path length is known to an accuracy of better than ½ of a wavelength. This may be achieved in calibration using a method of "fractional wavelengths" which is known in the art. Using this method the fractional wavelength difference is recorded using 3 or more defined wavelengths that are not integer multiples of one another. The fractional wavelengths, determined from the ellipticity of the recombined beam of both polarizations, can only be computed correctly for all calibration wavelengths if the correct refractive index corrected path length is used.

With wavelength measuring devices that operate in the field for a long period of time without recalibration or operate in a thermally unstable environment, the method of fractional wavelengths should be applied periodically during operation in the field. This can be achieved by using a tunable reference laser that is referenced, and sequentially locked, to three or more atomic or molecular absorption lines. The accuracy of locking to the side, or center, of these absorption lines may be better than 1 part in $10^7$.

For operating in the UV part of the spectrum, beamsplitters made of fused silica or appropriately cut CaF can be employed. In the infrared region used for communications, other material choices are available, such as the glass BK7.

The measurement systems described herein have the following advantages over etalon-based systems:

1) The sensitivity can be 20–50 times higher than that of an etalon-based wavelength meter.

2) No array detectors are required and simple photodiodes can be used instead. This allows much high repetition rates. Excimer laser and communications laser wavelength-locking and measurement, benefits from these improvements. Repetition rates of multiple kilohertz can be easily achieved.

The measurement systems described herein have the following advantages over systems using birefringent crystals:

1) The temperature stability of this system is much greater than that of birefringent crystals.

2) Because the two light paths of the orthogonal polarizations may be independently defined, higher order numbers or larger path differences may be achieved in a smaller form factor resulting in compact high resolution systems.

3) The wavelength & temperature dependencies of the refractive index are easier to calibrate. The ordinary and extraordinary axis of birefringent crystals may have different wavelength and temperature dependencies.

While the invention has been disclosed in connection with preferred embodiments of a wavemeter shown and described in detail, various modifications and improvements thereon will become readily apparent to those skilled in the art. For example, the apparatus disclosed herein can be used to tune communication lasers to appropriate wavelengths at a desired ITU grid position. An accuracy of better than 1 pm should be readily achievable. The apparatus can also be used to accurately determine the wavelength of an excimer laser used, for example, in microlithography for producing microelectronic chips with critical dimensions of less than 0.25 μm. An inaccurate wavelength determination can result in poor edge definition in particular with modem phase masks.

Accordingly, the spirit and scope of the present invention is to be limited only by the following claims.

What is claimed is:

1. Wavemeter for measuring an unknown wavelength of an optical beam, comprising:
   a reference beam of a known wavelength having two orthogonally circularly polarization directions;
   a polarizing beam splitter receiving said orthogonally polarized reference beam and defining an interferometer with a difference in an optical path length between said two orthogonally circularly polarized directions;
   a first analyzer receiving from the polarizing beam splitter a combined reference beam with said path length difference, said first analyzer determining the path length difference from an intensity measurement of said two orthogonally circularly polarization directions of said combined reference beam;
   a polarizer converting the optical beam of the unknown wavelength into two orthogonally circularly polarized beams, with the two orthogonally circularly polarized beams of the unknown wavelength traversing in the polarizing beam splitter an optical path that is substantially identical to an optical path of the reference beam in the polarizing beam splitter, and
   a second analyzer that receives from the polarizing beam splitter a combined beam of the unknown wavelength with said path length difference, said second analyzer determining the unknown wavelength from an intensity measurement of said two orthogonally circularly polarization directions of said combined beam of the unknown wavelength and said path length difference determined by the reference beam.

2. The wavemeter of claim 1, further comprising at least one chopper that alternatingly interrupts the reference beam and the optical beam having the unknown wavelength.

3. The wavemeter of claim 2, wherein said first and second analyzer are identical.

4. The wavemeter of claim 1, wherein said path length difference of said interferometer is determined by a length of the polarizing beam splitter.

5. The wavemeter of claim 1, further comprising a stepped reflector with a step height difference, wherein said path difference of said interferometer is determined by said step height difference.

6. The wavemeter of claim 1, and further comprising at least one additional polarization beam splitter with a different free spectral range (FSR), each of said at least two polarization beam splitters receiving a portion of said reference beam and said beam of the unknown wavelength and having associated therewith at least one analyzer receiving from the corresponding polarizing beam splitter a combined reference beam and a combined beam of the unknown wavelength with a path length difference characteristic of said polarizing beam splitter, each of said analyzers determining the unknown wavelength with an accuracy depending on the FSR of the corresponding polarization beam splitter.

7. The wavemeter of claim 1, wherein said first and second analyzer include photodiodes that perform said intensity measurements.

8. The wavemeter of claim 5, wherein the polarizing beam splitter is implemented as a Wollaston prism.

9. Method for determining an unknown wavelength of an optical beam, comprising:
   propagating in an polarizing beam splitter two orthogonally circularly polarized beams produced from a reference beam, said two orthogonally circularly polarized beams traversing different optical paths having different path lengths;
   determining a difference in said optical path lengths for said reference beam;
   generating from the optical beam of unknown wavelength two orthogonally circularly polarized beams;
   propagating in the polarizing beam splitter the two orthogonally circularly polarized beams produced from the optical beam along said different optical paths traversed by the reference beam;
   determining a phase shift between the propagated two orthogonally circularly polarized beams produced from the optical beam; and
   determining the unknown wavelength of the optical beam from the determined phase shift and the difference in the optical path lengths.

10. The method of claim 9, further comprising
    providing a plurality of polarizing beam splitters having mutually different free spectral ranges (FSR); and
    propagating a portion of said polarized reference beam and said polarized beam of the unknown wavelength through each of the plurality of polarizing beam splitters,
    wherein the unknown wavelength is determined with each polarizing beam splitter with an accuracy that depends on the FSR of the corresponding polarizing beam splitter.

11. The method of claim 9, wherein determining a difference in said optical path lengths for said reference beam includes separating said two orthogonally circularly polarized beams, and determining an intensity of each of the separated polarized beams.

12. The method of claim 9, wherein determining a phase shift between the propagated two orthogonally circularly polarized beams produced from the optical beam includes separating said propagated two orthogonally circularly polarized beams, and determining an intensity of each of the separated propagated polarized beams.

13. The method of claim 9, wherein determining the unknown wavelength includes monitoring a difference in said optical path lengths for said reference beam during a duration of a measurement, and updating said optical path lengths.

* * * * *